(12) United States Patent
Handa et al.

(10) Patent No.: US 6,713,155 B1
(45) Date of Patent: Mar. 30, 2004

(54) MAGNETIC RECORDING MEDIUM AND BASE FILM FOR THE SAME

(75) Inventors: Makoto Handa, Sagamihara (JP); Hirofumi Murooka, Sagamihara (JP); Toshifumi Osawa, Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/018,746

(22) PCT Filed: Jun. 15, 2000

(86) PCT No.: PCT/JP00/03905

§ 371 (c)(1),
(2), (4) Date: Dec. 21, 2001

(87) PCT Pub. No.: WO00/79524

PCT Pub. Date: Dec. 28, 2000

(30) Foreign Application Priority Data

Jun. 22, 1999 (JP) .......................................... 11-174821
Jun. 23, 1999 (JP) .......................................... 11-176155

(51) Int. Cl.⁷ ................................................. G11B 5/66
(52) U.S. Cl. ........................ 428/141; 428/212; 428/323; 428/336; 428/480; 428/694 ST; 428/694 SG; 428/694 SL; 428/900
(58) Field of Search ........................... 428/480, 694 ST, 428/694 SL, 694 SG, 900, 336, 141, 212, 323

(56) References Cited

U.S. PATENT DOCUMENTS 5,935,684 A * 8/1999 Handa et al. ................ 428/141
6,124,021 A * 9/2000 Hanada ....................... 428/141
6,338,890 B1 * 1/2002 Kobayashi et al. .......... 428/141

FOREIGN PATENT DOCUMENTS

| EP | 0 568 008 A1 | 11/1993 |
| EP | 0 579 121 A2 | 1/1994 |
| EP | 0 787 579 A1 | 8/1997 |
| EP | 0 811 478 A2 | 12/1997 |
| JP | 54-147010 | 11/1979 |
| JP | 09207290 | 8/1997 |
| JP | 9-207290 | 8/1997 |
| JP | 9-226063 | 9/1997 |
| JP | 9-234842 | 9/1997 |
| JP | 9-234842 A | 9/1997 |
| JP | 9-239829 A | 9/1997 |
| JP | 9-239829 * | 9/1997 |
| JP | 9-248879 * | 9/1997 |
| JP | 9-248879 A | 9/1997 |
| JP | 10-157039 A | 6/1998 |
| JP | 10-157039 * | 6/1998 |
| JP | 10-261218 * | 9/1998 |
| JP | 10-261218 A | 9/1998 |
| JP | 10-308012 * | 11/1998 |
| JP | 10-308012 A | 11/1998 |

\* cited by examiner

*Primary Examiner*—Leszek Kiliman
(74) *Attorney, Agent, or Firm*—Sughrue Mion, PLLC

(57) ABSTRACT

A base film for magnetic recording media, comprising a film layer containing inert fine particles and having an agglomeration rate of the inert fine particles on the surface of the film of 4 to 20%, or a film layer containing inert fine particles and an ester wax of an aliphatic monocarboxylic acid having 8 or more carbon atoms and a polyhydric alcohol and having a water contact angle of the exposed surface of 70 to 90°. A magnetic recording medium, particularly a metal deposited thin film magnetic recording medium comprising this base film is excellent in electromagnetic conversion characteristics.

9 Claims, No Drawings

MAGNETIC RECORDING MEDIUM AND BASE FILM FOR THE SAME

FIELD OF THE INVENTION

The present invention relates to a magnetic recording medium and a base film for the same. More specifically, it relates to a magnetic recording medium which has excellent electromagnetic conversion characteristics and a small reduction in output when it is repeatedly used and a base film for the same.

DESCRIPTION OF THE PRIOR ART

Remarkable progress has recently been made to increase the density of a magnetic recording medium, and the development and implementation of a ferromagnetic metal thin film magnetic recording medium comprising a ferromagnetic metal thin film formed on a non-magnetic base film by a physical deposition method such as vacuum deposition or sputtering, or plating are now underway. For example, there are known a Co-deposited tape (JP-A 54-147010) (the term "JP-A" as used herein means an "unexamined published Japanese patent application") and a Co—Cr alloy vertical magnetic recording medium (JP-A 52-134706).

As conventional coated magnetic recording media (magnetic recording media comprising a magnetic layer formed on a non-magnetic base film by mixing magnetic powders with an organic polymer binder and applying the resulting mixture) have a low recording density and a long recording wavelength, the magnetic layer has a large thickness of about 2 $\mu$m or more. In contrast to this, a metal thin film formed by thin film forming means such as vacuum deposition, sputtering or ion plating has a very small thickness of 0.2 $\mu$m or less.

Therefore, in the above high-density magnetic recording medium, the surface state of a non-magnetic base film has a great influence upon the surface properties of a magnetic recording layer. That is, the surface state of the non-magnetic base film appears as the unevenness of the surface of the magnetic recording layer directly which causes noise in recording and reproduction signals. Therefore, the surface of the non-magnetic base film is desirably as smooth as possible.

On the other hand, from the viewpoints of handling properties such as conveyance, scratching, winding-off and winding-up in the formation of a non-magnetic base film and the film formation process, if the surface of the film is too smooth, slipperiness between films degrades, resulting in a reduction in product yield and an increase in production cost. Therefore, the surface of the non-magnetic base film is preferably as rough as possible from the viewpoint of production cost.

Thus, the surface of the non-magnetic base film is required to be smooth from the viewpoint of electromagnetic conversion characteristics whereas it is required to be rough from the viewpoints of handling properties and production cost.

Further, in the case of a metal thin film magnetic recording medium, a treatment called "ion bombardment" that the surface of a base film is activated by ions is made before a metal thin film is formed in order to improve adhesion between the metal thin film and the base film.

Since high-temperature heat is applied to the front side of the film when this metal thin film is formed, the rear side of the film is cooled to prevent the fusion of the base film or deterioration in the physical properties such as mechanical properties of the film. To cool the rear side of the film, the base film is often wound round a drum-like cooling material. At this point, both ends of the base film are masked to prevent the formation of a metal thin film on the surface of the drum.

Accordingly, a portion whose surface is activated by ion bombardment and devoid of a metal thin film is continuously existent at both ends of a sample roll subjected to the above deposition step in a longitudinal direction. When the film is rolled, this portion is contacted to the opposite side of the film at a high pressure, there by readily causing blocking. To produce a metal thin film magnetic recording medium, after a metal thin film is deposited, aback coat layer and optionally a top coat layer are formed. If the above blocking occurs in the step of processing these layers, the base film will be readily broken or wrinkled with the result of a great reduction in yield.

To solve the above problem, JP-A 9-207290 and JP-A 9-226063 propose a laminated film consisting of a layer A and a layer B whose surface is rougher than the surface of the layer A. However,this method cannot suppress a reduction in output at the time of repeated use and the occurrence of the above blocking though electromagnetic conversion characteristics, handling properties and winding properties can be balanced to a certain extent.

SUMMARY OF THE INVENTION

It is an object of the present invention to provide a polyester base film for magnetic recording media, which overcomes the above defect of the prior art and has excellent electromagnetic conversion characteristics, a small reduction in output at the time of repeated use and high running durability.

It is another object of the present invention to provide a laminated thermoplastic resin base film for magnetic recording media, which overcomes the above defect of the prior art, has excellent anti-block properties, winding properties and processability and gives a metal deposition thin film magnetic recording medium having excellent electromagnetic conversion characteristics.

It is still another object of the present invention to provide a magnetic recording medium which comprises a magnetic layer on the above base film of the present invention and has excellent characteristic properties such as electromagnetic conversion characteristics.

Other objects and advantages of the present invention will become apparent from the following description.

According to the present invention, firstly, the above objects and advantages of the present invention are attained by a polyester base film for magnetic recording medium (may be referred to as "first base film of the present invention" hereinafter), which comprises a polyester film containing first inert fine particles having an average particle diameter of primary particles of 30 to 120 nm and a volume shape coefficient of 0.1 to $\pi/6$ and having a density of protrusions derived from the first inert fine particles on the surface of the film of 5,000 to 50,000/mm$^2$ and an agglomeration rate of the first inert fine particles forming the protrusions on the surface of the film of 4 to 20%.

According to the present invention, secondly, the above objects and advantages of the present invention are attained by a laminated thermoplastic resin base film for magnetic recording medium (may be referred to as "second base film of the present invention" hereinafter), consisting of a first thermoplastic resin layer having a surface roughness WRa of the exposed surface of 0.1 to 4 nm and a second thermoplastic resin layer which contains 0.001 to 5 wt % of third inert fine particles having an average particle diameter of primary particles of 0.1 to 2.0 μm and 0.001 to 10 wt % of an ester wax of an aliphatic monocarboxylic acid having 8 or more carbon atoms and a polyhydric alcohol and which has a water contact angle with the exposed surface of 70 to 90°, the first thermoplastic resin layer and the second thermoplastic resin layer being laminated together.

Thirdly, the above objects and advantages of the present invention are attained by a magnetic recording medium comprising either one of the first base film and the second base film of the present invention as a base film and a magnetic layer formed on the base film

DETAILED DESCRIPTION OF THE PREFERRED EMBODIMENTS

A description is first given of the first base film of the present invention.

The polyester used in the present invention is an aliphatic, alicyclic or aromatic polyester. Out of these, an aromatic polyester is particularly preferred.

Examples of the aromatic polyester include polyethylene terephthalate, polyethylene isophthalate, polytetramethylene terephthalate, poly-1,4-cyclohexylenedimethylene terephthalate and polyethylene-2,6-naphthalene dicarboxylate. Out of these, polyethylene terephthalate and polyethylene-2,6-naphthalene dicarboxylate are preferred.

The polyester may be a homopolyester or copolyester. In the case of a copolyester, examples of a comonomer for polyethylene terephthalate or polyethylene-2,6-naphthalene dicarboxylate include other diol components such as diethylene glycol, propylene glycol, tetramethylene glycol, hexamethylene glycol, neopentyl glycol, polyethylene glycol, 1,4-cyclohexanedimethanol and p-xylylene glycol, other dicarboxylic acid components such as adipic acid, sebacic acid, phthalic acid, isophthalic acid, terephthalic acid (in the case of polyethylene-2,6-naphthalene dicarboxylate), 2,6-naphthalenedicarboxylic acid (in the case of polyethylene terephthalate) and 5-sodium sulfoisophthalic acid, and oxycarboxylic acid components such as p-oxyethoxybenzoic acid. The amount of the comonomer is 20 mol % or less, preferably 10 mol % or less based on the total of all the diol components in the case of a diol component or the total of all the dicarboxylic acids and oxycarboxylic acids in the case of dicarboxylic acid component and an oxycarboxylic acid component.

A polyfunctional compound having a functionality of 3 or more, such as trimellitic acid or pyromellitic acid, may be further copolymerized. In this case, it may be copolymerized in an amount that the polymer is substantially linear, for example, 2 mol % or less based on the total of all the dicarboxylic acid components.

The polyester film of the present invention (may be referred to as "polyester layer A" hereinafter) contains first inert fine particles (may be referred to as "inert particles A" hereinafter). Examples of the inert particles A include heat resistant organic polymer fine particles such as crosslinked silicone resin, crosslinked polystyrene, crosslinked styrene-divinylbenzene copolymer, polymethyl methacrylate, methyl methacrylate copolymer, crosslinked methyl methacrylate copolymer, polytetrafluoroethylene, polyvinylidene fluoride, polyacrylonitrile and benzoguanamine resin; and inorganic compounds such as silica, alumina, titanium dioxide, kaolin, talc, graphite, calcium carbonate, feldspar, molybdenum disulfide, carbon black and barium sulfate.

The average particle diameter of primary particles of the inert particles A is 30 to 120 nm, preferably 35 to 110 nm, more preferably 40 to 100 nm. When the average particle diameter is smaller than 30 nm, satisfactory running durability cannot be obtained and when the average particle diameter is larger than 120 nm, electromagnet conversion characteristics deteriorate.

As for the shape of the inert particles A, the volume shape coefficient (f) represented by the following equation (I) is 0.1 to π/6, preferably 0.3 to π/6, more preferably 0.4 to π/6:

$$f = V/R^3 \qquad (I)$$

wherein f is a volume shape coefficient, V is the volume (μm$^3$) of each particle, and R is the average particle diameter (μm) of the particles.

The inert particles A having a volume shape coefficient (f) of π/6 are globular (spherical). That is, the inert particles A having a volume shape coefficient (f) of 0.4 to π/6 are substantially globular, spherical or oval like a rugby ball which are particularly preferred. The particles having a volume shape coefficient (f) of less than 0.1, for example, flaky particles deteriorate running durability disadvantageously.

The density of protrusions derived from the inert particles A on the surface of the polyester layer A is 5,000 to 50,000/mm$^2$, preferably 7,500 to 45,000/mm$^2$, more preferably 10,000 to 40,000/mm$^2$. When the density of protrusions derived from the inert particles A on the surface is lower than 5,000/mm$^2$, the friction of the magnetic layer with the magnetic head becomes high and the running durability of the magnetic layer at the time of repeated use deteriorates disadvantageously. When the density of protrusions is higher than 50,000/mm$^2$, more protrusions fall off with the result of more drop-outs disadvantageously.

The density of protrusions can be adjusted by the concentration and/or amount of a glycol slurry of particles which is added when the polyester is polymerized.

The agglomeration rate of the inert particles A on the surface of the polyester layer A is 4 to 20%, preferably 5 to 18%, more preferably 6 to 16%, particularly preferably 7 to 14%. When the agglomeration rate of the particles is lower than 4%, running durability at the time of repeated use becomes unsatisfactory and a marked reduction in output is seen. When the agglomeration rate is higher than 20%, electromagnetic conversion characteristics deteriorate.

The agglomeration rate of the particles can be adjusted by controlling the pH of the above glycol slurry of the particles which is added when the polyester is polymerized and reaction thereof, or by controlling the reaction process, temperature and injection speed for injecting the above slurry.

Another layer such as a coating layer or another polyester layer may be formed on one side or both sides of the first base film of the present invention in limits not prejudicial to the object of the present invention so as to improve the characteristic properties of a magnetic tape such as handling properties at the time of production and processing.

For instance, when a magnetic tape is produced from the first base film of the present invention, a first coating layer (may be referred to as "coating layer B" hereinafter) which contains second inert fine particles (may be referred to as "inert particles B" hereinafter) having an average particle diameter of 10 to 50 nm and a volume shape coefficient of 0.1 to π/6 is formed on the magnetic layer side of the polyester layer A containing inert particles A in order to prevent a reduction in output (deterioration durability in still mode) caused by repeated contact with the magnetic head.

Preferably, the above coating layer B has a density of protrusions derived from the inert particles B on the surface of 2,000,000 to 20,000,000/mm² and a surface roughness (Ra) of 0.1 to 2.0 nm.

The inert particles B contained in the above coating layer B are preferably inert particles which hardly settle in a coating solution and have relatively low specific gravity. Preferred examples of the inert particles B include heat resistant polymer particles made of materials such as crosslinked silicone resin, crosslinked acrylic resin, crosslinked polystyrene, melamine.formaldehyde resin, aromatic polyamide resin, polyamide-imide resin, crosslinked polyesters and wholly aromatic polyesters, silicon dioxide (silica) and calcium carbonate. Particularly preferred are crosslinked silicone resin particles, core-shell type organic particles (core: crosslinked polystyrene, shell: polymethyl methacrylate) and silica.

The average particle diameter of primary particles of the inert particles B is 10 to 50 nm, preferably 15 to 45 nm, more preferably 20 to 40 nm. When the average particle diameter is smaller than 10 nm, the slipperiness of the obtained film may become unsatisfactory and when the average particle diameter is larger than 50 nm, the electromagnetic conversion characteristics of the obtained magnetic recording medium may become unsatisfactory.

The inert particles B have a volume shape coefficient (f) of 0.1 to $\pi/6$, preferably 0.2 to $\pi/6$, more preferably 0.3 to $\pi/6$, particularly preferably 0.4 to $\pi/6$. Particles having a volume shape coefficient (f) of less than 0.1, for example, flaky particles make it difficult to obtain the effect of improving the slipperiness of the film.

The density of protrusions derived from the inert particles B on the surface of the coating layer B is 2,000,000 to 20,000,000/mm², preferably 3,000,000 to 15,000,000/mm², more preferably 3,500,000 to 12,000,000/mm². When the density of protrusions on the surface of the coating layer B is lower than 2,000,000/mm², the slipperiness of the obtained film may become unsatisfactory and when the density of protrusions is higher than 20,000,000/mm2, the electromagnetic conversion characteristics of the obtained magnetic recording medium may become unsatisfactory.

The surface roughness (Ra) of the coating layer B is 0.1 to 2.0 nm, preferably 0.2 to 1.8 nm, more preferably 0.3 to 1.6 nm. When the surface roughness (Ra) is lower than 0.1 nm, the slipperiness of the obtained film may become unsatisfactory and when the surface roughness is higher than 2.0 nm, the electromagnetic conversion characteristics of the obtained magnetic recording medium may become unsatisfactory.

The surface roughness (Ra) can be adjusted by the particle diameter and/or amount of the inert particles B to be contained in the coating layer B.

In the coating layer B, a binder resin is used to bind the inert particles B. The binder resin is preferably an aqueous polyester resin, aqueous acrylic resin or aqueous polyurethane resin, particularly preferably an aqueous polyester resin.

Examples of the aqueous polyester resin include polyester resins each of which consists of at least one polycarboxylic acid such as isophthalic acid, phthalic acid, 1,4-cyclohexanedicarboxylic acid, 2,6-naphthalenedicarboxylic acid, 4,4'-diphenyldicarboxylic acid, adipic acid, sebacic acid, dodecanedicarboxylic acid, succinic acid, sodium 5-sulfoisophthalate, potassium 2-sulfoterephthalate, trimellitic acid, trimesic acid, monopotassium salt of trimellitic acid or p-hydroxybenzoic acid as an acid component and at least one polyhydroxy compound such as ethylene glycol, diethylene glycol, propylene glycol, 1,4-butanediol, 1,6-hexanediol, 1,4-cyclohexanedimethanol, p-xylylene glycol, dimethylol propane or bisphenol A adduct with ethylene oxide as a glycol component; graft polymers and block copolymers prepared by binding an acrylic polymer chain to a polyester chain; and acryl modified polyester resins comprising two different polymers which form a specific physical structure in the micro-particle (IPN (inter-penetrating polymer network) type or core-shell type). The aqueous polyester resin may be any type which is soluble, emulsifiable or finely dispersible in water. A sulfonate group, carboxylate group or polyether unit may be introduced into the molecule of the polyester resin to provide hydrophilic nature.

It is possible and preferred to form a coating layer and/or another polyester layer on the side opposite to the magnetic layer side when a magnetic tape is to be produced from the polyester film of the present invention in order to improve handling properties at the time of producing and processing the film.

For instance, when a second coating layer (may be referred to as "coating layer C" hereinafter) which contains fourth inert fine particles (may be referred to as "inert particles C" hereinafter) having an average particle diameter of primary particles of 20 to 80 nm is formed on the side opposite to the magnetic layer side, when a magnetic tape is to be produced of the polyester layer A containing the inert particles A and the above coating layer C has a surface roughness (Ra) of 2.5 to 10.0 nm and a thickness of 8 to 50 nm, handling properties can be improved without impairing the effect of the present invention.

Examples of the inert particles C to be contained in the above coating layer C are the same as those listed for the above inert particles B.

The average particle diameter of primary particles of the inert particles C is 20 to 80 nm, preferably 30 to 70 nm, more preferably 40 to 60 nm. When the average particle diameter is smaller than 20 nm, the slipperiness of the obtained film may become unsatisfactory and when the average particle diameter is larger than 80 nm, the electromagnetic conversion characteristics of the obtained magnetic recording medium may become unsatisfactory.

The surface roughness (Ra) of the coating layer C is 2.5 to 10.0 nm, preferably 3.0 to 9.0 nm, more preferably 3.5 to 8.0 nm. When the surface roughness (Ra) is lower than 2.5 nm, the slipperiness of the obtained film may become unsatisfactory and when the surface roughness is higher than 10.0 nm, the electromagnetic conversion characteristics of the obtained magnetic recording medium may become unsatisfactory.

The thickness of the coating layer C is 8 to 50 nm, preferably 9 to 40 nm, more preferably 10 to 30 nm. When the thickness of the coating layer C is smaller than 8 nm, the inert particles may fall off and when the thickness is larger than 50 nm, the running durability of the obtained tape may become unsatisfactory.

Examples of the binder resin for binding the above inert particles C are the same as those listed for the above inert particles B.

An alkylcellulose or siloxane copolymerized acrylic resin may be added to the coating layer C in order to further improve the strength of the coating film and anti-block properties.

Another polyester layer may be used in place of the above coating layer C to achieve the same purpose.

For instance, when a second polyester layer (may be referred to as "polyester layer D (rough layer)" hereinafter)

which contains third inert fine particles (may be referred to as "inert particles D" hereinafter) having an average particle diameter of primary particles of 0.1 to 2.0 μm is formed on the side opposite to the magnetic layer side, when a magnetic tape is to be produced of the polyester layer A (flat layer) containing inert particles A and the above polyester layer D has a surface roughness (Ra) of 2.5 to 10.0 nm and a thickness of preferably 0.1 to 2.0 μm, handling properties can be improved without impairing the effect of the present invention.

Examples of the polyester of the above polyester layer D are the same as those listed for the above polyester layer A. The polyester of the polyester layer D may be different from the polyester of the polyester layer A but preferably the same as the polyester layer A.

Examples of the inert particles D to be contained in the above polyester layer D are the same as those listed for the above inert particles A.

The average particle diameter of the inert particles D is 0.1 to 2.0 μm, preferably 0.2 to 1.5 μm, more preferably 0.3 to 1.0 μm. When the average particle diameter is smaller than 0.1 μm, the slipperiness of the obtained film may become unsatisfactory and when the average particle diameter is larger than 2.0 μm, the electromagnetic conversion characteristics of the obtained magnetic recording medium may become unsatisfactory.

The inert particles D may consist of one type of particles or a mixture of two or more different types of particles. When the inert particles D consist of two or more different types of particles, particles having an average particle diameter of primary particles of 0.1 to 2.0 μm and fine particles having an average particle diameter of primary particles of 0.01 to 0.1 μm such as colloidal silica or alumina having an α, γ, δ or θ crystal form may be preferably used. Out of the above examples of the inert particles A, fine particles having an average particle diameter of primary particles of 0.01 to 0.1 μm may also be used.

The content of the fine particles is preferably 0.001 to 5 wt %, more preferably 0.005 to 1 wt %, particularly preferably 0.01 to 0.5 wt %.

The surface roughness (Ra) of the polyester layer D is 2.5 to 10.0 nm, preferably 3.0 to 9.0 nm, more preferably 4.0 to 8.5 nm. When the surface roughness (Ra) is lower than 2.5 nm, the slipperiness of the obtained film may become unsatisfactory and when the surface roughness (Ra) is higher than 10.0 nm, the electromagnetic conversion characteristics of the obtained magnetic recording medium may become unsatisfactory.

The thickness of the polyester layer D is preferably 0.1 to 2.0 μm, more preferably 0.2 to 1.5 μm, much more preferably 0.3 to 1.2 μm. When the thickness is smaller than 0.1 μm, the inert particles may fall off and when the thickness is larger than 2.0 μm. the running durability of the obtained tape may become unsatisfactory.

It is possible and preferred to form the above coating layer C on the surface (side opposite to the magnetic layer side when a magnetic tape is to be produced from the polyester film) of the polyester layer D formed on the above polyester layer A.

The first base film of the present invention may be produced by conventionally known methods and methods accumulated in the industry.

For example, a polyester is molten at a temperature of melting point (Tm) to (Tm+70)° C. to form an unstretched film having an intrinsic viscosity of 0.35 to 0.9 dl/g which is then stretched to 2.5 to 5.5 times in a uniaxial direction (longitudinal or transverse direction) at a temperature of (Tg−10) to (Tg+70)° C. (Tg: glass transition temperature of the polyester) and then to 2.5 to 5.5 times in a direction perpendicular to the above direction (transverse direction when the film is first stretched in a longitudinal direction) at a temperature of (Tg) to (Tg+70)° C. to produce a biaxially oriented film. In this case,the area draw ratio is preferably 9 to 25 times, more preferably 12 to 25 times. Orientation may be either simultaneous biaxial orientation or sequential biaxial orientation.

Further, the above biaxially oriented film may be heat set at a temperature of (Tg+70) to (Tm)° C. For example, a polyethylene terephthalate film is preferably heat set at 190 to 230° C. The heat setting time is, for example, 1 to 60 sec.

To produce a polyester film, additives other than the above inert particles, such as a stabilizer, colorant and intrinsic viscosity modifier for a molten polymer may be contained in the polyester as required.

The laminate consisting of the polyester layer A and the polyester layer D may be produced by conventionally known methods and methods accumulated in the industry. Out of these, it is preferably produced by coextrusion.

For example, in the case of a biaxially oriented polyester film, a polyester (polyester A) which contains the above inert particles A and will form a flat layer and a polyester (polyester D) which contains the inert particles D and will form a rough layer are laminated together in a molten state in an extrusion nozzle or before the nozzle (the former is called "multi-manifold system" and the latter is called "feed block system") to produce a laminate structure having a suitable thickness ratio which is then coextruded into the form of a film from the nozzle at a temperature of (Tm) to (Tm+70)° C. and solidified by quenching to produce an unstretched laminated film.

The formation of the coating layer B and the coating layer C on the polyester layer of the present invention may be carried out by applying aqueous coating solutions.

Coating is carried out on the surface of the polyester layer before it is subjected to the final stretching and the film is preferably stretched in at least a uniaxial direction after coating. The coating film is dried before or during stretching. Coating is preferably carried out on an unstretched laminated film or longitudinally (uniaxially) stretched laminated film, particularly preferably a longitudinally (uniaxially) stretched laminated film. Coating is not particularly limited but roll coating and die coating are used.

The solid content of the above coating solution, particularly an aqueous coating solution is preferably 0.2 to 8 wt %, more preferably 0.3 to 6 wt %, particularly preferably 0.5 to 4 wt %. Other components such as a surfactant, stabilizer, dispersant, ultraviolet light absorber and thickener may be added to the coating solution (preferably an aqueous coating solution) in limits that do not prevent the effect of the present invention.

In the present invention, the Young's moduli in longitudinal and transverse directions of the laminated film are adjusted to preferably 450 kg/mm$^2$ or more and 600 kg/mm$^2$ or more, more preferably 480 kg/mm$^2$ or more and 680 kg/mm$^2$ or more, much more preferably 550 kg/mm$^2$ or more and 800 kg/mm$^2$ or more, particularly preferably 550 kg/mm$^2$ or more and 1,000 kg/mm$^2$ or more, respectively, to improve the properties such as head touch and running durability of the obtained magnetic recording medium and reduce the thickness of the film.

The crystallinity of the polyester layer is desirably to 50% when the polyester is polyethylene terephthalate and 28 to 38% when the polyester is polyethylene-2,6-naphthalene dicarboxylate. When the crystallinity falls below the lower limit, the heat shrinkage factor tends to become large and when the crystallinity exceeds the upper limit, the abrasion resistance of the film deteriorates whereby white powders are readily generated when the film is brought into sliding contact with the surface of a roll or guide pin.

The first base film of the present invention can be changed into a deposited magnetic recording medium for high-density recording which has excellent electromagnetic conversion characteristics such as output at a short-wavelength range, S/N and C/N, few drop outs and a small error rate by forming a ferromagnetic metal thin film layer made of iron, cobalt, chromium or an alloy or oxide essentially composed thereof on the surface of the polyester layer A (flat layer), preferably the coating layer B by vacuum vapor deposition, sputtering, ion plating or the like, sequentially forming a protective layer of diamond-like carbon (DLC) or the like and a fluorine-containing carboxylic acid-based lubricant layer on the surface of the ferromagnetic metal thin film layer as required according to purpose and use, and further forming a back coat layer on the side opposite to the ferromagnetic layer of the polyester layer A, preferably the surface of the coating layer C or the polyester layer D as required by a known method. This deposited magnetic recording medium is extremely useful as a magnetic tape medium for Hi8 for recording analog signals and digital video cassette recorders (DVC), data 8 mm and DDSIV for recording digital signals.

The first base film of the present invention can be further changed into a metal coated magnetic recording medium for high-density recording which has excellent electromagnetic conversion characteristics such as output at a short-wavelength range, S/N and C/N, few drop outs and a small error rate by applying a coating solution prepared by uniformly dispersing iron or needle-like fine magnetic powders (metal powders) containing iron as the main component into a binder such as polyvinyl chloride or vinyl chloride-vinyl acetate copolymer to the surface of the polyester layer A (flat layer), preferably the coating layer B to form a magnetic layer having a thickness of 1 $\mu$m or less, preferably 0.1 to 1 $\mu$m, and further forming a back coat layer on the side opposite to the magnetic layer of the polyester layer A, preferably the surface of the coating layer C or the polyester layer D as required by a known method. A non-magnetic layer may be formed on the surface of the polyester layer A, preferably the coating layer B as a layer underlying the metal powder-containing magnetic layer as required by applying a coating solution prepared by dispersing fine titanium oxide particles or the like contained in the non-magnetic layer in the same organic binder as that of the magnetic layer. This metal coated magnetic recording medium is extremely useful as a magnetic tape medium for 8 mm video, Hi8, β-cam SP and W-VHS for recording analog signals and digital video cassette recorders (DVC), data 8 mm, DDSIV, digital β-cam, D2, D3 and SX for recording digital signals.

The first base film of the present invention can be further changed into an oxide coated magnetic recording medium for high-density recording which has excellent electromagnetic conversion characteristics such as output at a short-wavelength range, S/N and C/N, few drop outs and a small error rate by applying a coating solution prepared by uniformly dispersing needle-like fine magnetic powders such as iron oxide or chromium oxide, or lamellar fine magnetic powders such as barium ferrite into a binder such as polyvinyl chloride or vinyl chloride-vinyl acetate copolymer to the surface of the polyester layer A (flat layer), preferably the coating layer B to form a magnetic layer having a thickness of 1 $\mu$m or less, preferably 0.1 to 1 $\mu$m and further forming a back coat layer on the side opposite to the magnetic layer of the polyester layer A, preferably the surface of the coating layer C or the polyester layer D as required by a known method. A non-magnetic layer may be formed on the surface of the polyester layer A, preferably the coating layer B as a layer underlying the above oxide powder-containing magnetic layer as required by applying a coating solution prepared by dispersing fine titanium oxide particles or the like contained in the non-magnetic layer in the same organic binder as that of the magnetic layer. This oxide coated magnetic recording medium is useful as an oxide coated magnetic recording medium for high-density recording, such as data streamer QIC for recording digital signals.

The above W-VHS is an analog HDTV signal recording VTR and the above DVC can be used to record digital HDTV signals. It can be said that the film of the present invention is a base film very useful for HDTV VTR magnetic recording media.

The magnetic recording medium comprising the first base film of the present invention and a magnetic layer as described above is preferably one of the following magnetic recording media.

(i) A magnetic recording medium comprising a base film which consists of the polyester base film (polyester layer A), the above first coating layer formed on one side of the polyester base film and the above second polyester layer formed on the other side of the polyester base film, and a magnetic layer formed on the first coating layer of the base film.

(ii) A magnetic recording medium comprising a base film which consists of the polyester base film (polyester layer A), the above first coating layer formed on one side of the polyester base film and the above second coating layer formed on the other side of the polyester. base film, and a magnetic layer formed on the first coating layer of the base film.

A description is subsequently given of the second base film of the present invention.

In the present invention, examples of the thermoplastic resins for forming the first thermoplastic resin layer (called "thermoplastic resin layer B" or "layer B") and the second thermoplastic resin layer (also called "thermoplastic resin layer A" or "layer A") include polyester-based resins, polyamide resins, polyimide resins, polyether-based resins, polycarbonate-based resins, polyvinyl-based resins and polyolefin-based resins. Out of these, polyester-based resins are preferred and aromatic polyesters are particularly preferred.

The thermoplastic resin for forming the first thermoplastic resin layer (may be referred to as "thermoplastic resin B" hereinafter) and the thermoplastic resin for forming the second thermoplastic resin layer (may be referred to as "thermoplastic resin A" hereinafter) may be different but preferably the same.

The above aromatic polyesters include polyethylene terephthalate, polyethylene isophthalate, polytetramethylene terephthalate, poly-1,4-cyclohexylene dimethylene terephthalate and polyethylene-2,6-naphthalate (polyethylene-2,6-naphthalene dicarboxylate). Out of these, polyethylene terephthalate and polyethylene-2,6-naphthalate are preferred.

The polyester may be a homopolyester or copolyester. In the case of a copolyester, examples of a comonomer for polyethylene terephthalate or polyethylene-2,6-naphthalate include other diol components such as diethylene glycol, propylene glycol, tetramethylene glycol, hexamethylene glycol, neopentyl glycol, polyethylene glycol, 1,4- cyclohexanedimethanol and p-xylylene glycol, other dicarboxylic acid components such as adipic acid, sebacic acid, phthalic acid, isophthalic acid, terephthalic acid (in the case of polyethylene-2,6-naphthalate), 2,6-naphthalenedicarboxylic acid (in the case of polyethylene terephthalate) and 5-sodium sulfoisophthalic acid, and oxycarboxylic acid components such as p-oxyethoxybenzoic acid. The amount of the comonomer is 20 mol % or less, preferably 10 mol % or less based on the total of all the diol components in the case of a diol component or the total of all the dicarboxylic acids and oxycarboxylic acids in the case of a dicarboxylic acid component and an oxycarboxylic acid component.

A polyfunctional compound having a functionality of 3 or more such as trimellitic acid or pyromellitic acid may be further copolymerized. In this case, it may be copolymerized in an amount that the polymer is substantially linear, for example, 2 mol % or less.

Examples of a comonomer for polyesters other than polyethylene terephthalate and polyethylene-2,6-naphthalate are the same as above.

The above polyesters are known per se and may be produced by methods known per se.

The thermoplastic resin layer A contains third inert particles (may be referred to as "inert particles D" hereinafter) having an average particle diameter of primary particles of 100 to 2,000 nm in an amount of 0.001 to 5 wt % based on the layer A.

Preferred examples of the inert particles D include inorganic compound fine particles such as (1) heat resistant polymer particles (particles of crosslinked silicone resin, crosslinked polystyrene, crosslinked acrylic resin, melamine-formaldehyde resin, aromatic polyamide resin, polyimide resin, polyamide-imide resin and crosslinked polyesters), (2) metal oxides (such as aluminum sesquioxide, titaniumdioxide, silicondioxide, magnesiumoxide, zincoxide and zirconium oxide), (3) metal carbonates (such as magnesium carbonate and calcium carbonate), (4) metal sulfates (such as calcium sulfate and barium sulfate), (5) carbon (such as carbon black, graphite and diamond), and (6) clay minerals (such as kaolin, clay and bentonite). Out of these, crosslinked silicone resin particles, crosslinked polystyrene resin particles, melamine-formaldehyde resin particles, polyamide-imide resin particles, and fine particles made from aluminum sesquioxide (alumina), titanium dioxide, silicon dioxide, zirconium oxide, synthetic calcium carbonate, barium sulfate, diamond and kaolin are preferred. More preferred are crosslinked silicone resin particles, crosslinked polystyrene resin particles, and fine particles made from aluminum sesquioxide (alumina), titanium dioxide, silicon dioxide and calcium carbonate.

The average particle diameter (dD) of primary particles of the inert particles D is 100 to 2,000 nm, preferably 200 to 1,500 nm, more preferably 200 to 1,000 nm, particularly preferably 200 to 800 nm.

The content of the inert particles D is 0.001 to 5 wt %, preferably 0.01 to 4 wt %, more preferably 0.03 to 3 wt %, particularly preferably 0.05 to 2.0 wt % based on the layer A.

When the average particle diameter of primary particles of the inert particles D is smaller than 100 nm or when the content thereof is lower than 0.001 wt % based on the layer A, winding properties and anti-block properties become unsatisfactory. When the average particle diameter is larger than 2,000 nm or when the content is higher than 5 wt % based on the layer A, the surface of the layer B becomes rough by the shape transfer of protrusions to the surface of the layer B or the protrusions thrusting up the layer B from below, thereby deteriorating electromagnetic conversion characteristics.

The inert particles D may consist of one type of particles or a mixture of two or more different types of particles. When the inert particles D consist of a mixture of two or more different types of particles, colloidal silica and fine particles such as alumina having an $\alpha$, $\gamma$, $\delta$ or $\theta$ crystal form may be preferably used as second and third particles (fine particles) having a smaller average particle diameter of primary particles than the average particle diameter dD of primary particles of the above inert particles D. Out of the above examples of the inert particles D having an average particle diameter dD, fine particles having a small average particle diameter may also be used as the second and third particles (fine particles).

The average particle diameter of the fine particles is preferably 5 to 400 nm, more preferably 10 to 300 nm, particularly preferably 30 to 250 nm and preferably 50 nm or more, more preferably 100 nm or more, particularly preferably 150 nm or more smaller than the above average particle diameter dD. The total content of the second and third particles (fine particles) is preferably 0.005 to 1 wt %, more preferably 0.01 to 0.7 wt %, particularly preferably 0.05 to 0.5 wt % based on the layer A.

The thermoplastic resin layer A contains an ester wax of an aliphatic monocarboxylic acid having 8 or more carbon atoms and a polyhydric alcohol in an amount of 0.001 to 10 wt % based on the layer A.

The number of carbon atoms of the above aliphatic monocarboxylic acid is 8 or more, preferably 8 to 34. When the number of carbon atoms is smaller than 8, the heat resistance of the obtained ester wax becomes unsatisfactory whereby the aliphatic monocarboxylic acid is easily decomposed under the heating condition for dispersing the ester wax in the thermoplastic resin A.

Examples of the aliphatic monocarboxylic acid having 8 or more carbon atoms include pelargonic acid, capric acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid, melissic acid, hentriacontanoic acid, petroselinic acid, oleic acid, erucic acid, linoleic acid and acid mixtures containing these.

The alcohol component of the ester wax of the present invention is a polyhydric alcohol having 2 or more hydroxyl groups. From the viewpoint of heat resistance, it is preferably a polyhydric alcohol having 3 or more hydroxyl groups. If a monoalcohol is used, the heat resistance of the formed ester wax will become unsatisfactory. Preferred examples of the polyhydric alcohol having 2 hydroxyl groups include ethylene glycol, propylene glycol, trimethylene glycol, 1,4-butanediol, 1,5-pentanediol, 1,6-hexanediol, 1,7-heptanediol, 1,8-octanediol, 1,9-nonanediol, 1,10-decanediol, diethylene glycol, triethylene glycol and polyethylene glycol. Examples of the polyhydric alcohol having 3 or more hydroxyl groups include glycerin, erythritol, threitol, pentaerythritol, arabitol, xylitol, talitol, sorbitol and mannitol.

The ester wax obtained from the above aliphatic monocarboxylic acid and polyhydric alcohol is a monoester, diester or triester, depending on the number of hydroxyl groups of the polyhydric alcohol. From the viewpoint of heat resistance, a diester is more preferred than a monoester and a triester is more preferred than a diester. Preferred examples of ester wax include sorbitan tristearate, pentaerythritol tribehenate, glycerin tripalmitate and polyoxyethylene distearate.

The above ester wax may be a partly saponified ester wax consisting of an aliphatic monocarboxylic acid and a polyhydric alcohol. The partly saponified ester wax is obtained by partly esterifying a higher fatty acid having 8 or more carbon atoms with a polyhydric alcohol and then saponifying the partly esterified product with a metal hydroxide having a valence of 2 or more. Examples of the partly saponified ester wax include Wax E, Wax OP, Wax O, Wax OM and Wax FL (trade names of Hoechst AG) obtained by saponifying a montanic acid diol ester with calcium hydroxide.

The above ester waxes may be used alone or in combination of two or more.

The thermoplastic resin layer A contains the above ester wax in an amount of 0.001 to 10 wt %, preferably 0.01 to 5 wt %, more preferably 0.05 to 2 wt %, particularly preferably 0.1 to 1 wt % based on the layer A. When the content of the ester wax in the layer A is lower than 0.001 wt %, the effect of improving blocking is not obtained. When the content is higher than 10 wt %, a large amount of a wax component is transferred to the opposite side of the rolled film by bleed-out in the film production process. Therefore, adhesion between a metal deposited layer and the base film is prevented disadvantageously.

The water contact angle of the surface not in contact with the layer B of the above thermoplastic resin layer A is 70 to 90°, preferably 71 to 89°, more preferably 72 to 88°, particularly preferably 74 to 86°. When the water contact angle is smaller than 70°, the effect of improving blocking is not obtained. When the water contact angle is larger than 90°, coating becomes nonuniform in the step of applying a back coat layer.

The first thermoplastic resin layer (may be referred to as "thermoplastic resin layer B" hereinafter) is existent on the magnetic layer side, when a magnetic tape is to be produced, of the polyester film of the present invention in order to improve the handling properties and characteristic properties of the magnetic tape at the time of producing or processing the film.

The surface roughness WRa of the thermoplastic resin layer B is 0.1 to 4 nm, preferably 0.2 to 3.5 nm, more preferably 0.3 to 3.0 nm, particularly preferably 0.4 to 2.5 nm. When WRa is less than 0.1 nm, film production becomes extremely difficult and when WRa is more than 4 nm, electromagnetic conversion characteristics deteriorate.

This surface roughness (WRa) can be adjusted by the particle diameter and/or amount of the inert particles to be contained in the thermoplastic resin layer B.

The thermoplastic resin layer B may not contain particles substantially or may contain inert fine particles (may be referred to as inert particles En hereinafter).

When the thermoplastic resin layer B does not contain particles substantially, a magnetic recording medium having excellent electromagnetic conversion characteristics is obtained advantageously.

When particles are added to the thermoplastic resin layer B in limits that do not exert a bad influence upon electromagnetic conversion characteristics, running durability is improved. Stated more specifically, the inert particles E having a volume shape coefficient of 0.1 to $\pi/6$ and an average particle diameter of primary particles of 30 to 400 nm are preferably contained in the thermoplastic resin layer B in an amount of 0.001 to 0.2 wt %.

Preferred examples of the inert particles E are the same as those listed for the above inert particles A.

The inert particles E have a volume shape coefficient (f) represented by the following equation (I) of 0.1 to $\pi/6$, preferably 0.2 to $\pi/6$, more preferably 0.4 to $\pi/6$:

$$f=V/R^3 \qquad (I)$$

wherein f is a volume shape coefficient, V is the volume ($\mu m^3$) of each particle and R is the average particle diameter ($\mu m$) of the particles.

The particles having a volume shape coefficient (f) of $\pi/6$ are globular (spherical). That is, the particles having a volume shape coefficient (f) of 0.4 to $\pi/6$ are substantially globular, spherical or oval like a rugby ball which are preferred as the inert particles E. The particles having a volume shape coefficient (f) of less than 0.1, for example, flaky particles deteriorate running durability disadvantageously.

The average particle diameter dE of the inert particles E is 30 to 400 nm, preferably 40 to 200 nm, more preferably 50 to 100 nm. When the average particle diameter dE is smaller than 30 nm, the slipperiness of the obtained film may become unsatisfactory and when the average particle diameter dE is larger than 400 nm, the electromagnetic conversion characteristics of the obtained magnetic recording medium may become unsatisfactory.

The inert particles E may consist of one type of particles or a mixture of two or more different types of particles.

When the inert particles E are contained in the thermoplastic resin layer B, the content of the inert particles E in the thermoplastic resin layer B is 0.001 to 0.2 wt %, preferably 0.01 to 0.1 wt %, more preferably 0.02 to 0.05 wt % based on the layer B. When the content is lower than 0.001 wt %, the slipperiness of the obtained film may become unsatisfactory and when the content is higher than 0.2 wt %, the electromagnetic conversion characteristics of the obtained magnetic recording medium may become unsatisfactory.

When the first coating layer which contains 0.5 to 30 wt % of the second inert fine particles (may be referred to as "inert particles B" hereinafter) having an average particle diameter of 10 to 50 nm and a volume shape coefficient of 0.1 to $\pi/6$ is formed on the surface not in contact with the thermoplastic resin layer A of the thermoplastic layer B, a metal deposited magnetic recording medium having excellent running durability is obtained advantageously.

The resin for forming the first coating layer is preferably an aqueous polyester resin, aqueous acrylic resin or aqueous polyurethane resin, particularly preferably an aqueous polyester resin.

Examples of the aqueous polyester resin are the same as those listed for the first base film of the present invention.

The inert particles B contained in the first coating layer are preferably inert particles which hardly settle in a coating solution and have relatively low specific gravity. Preferred examples of the inert particles B include heat resistant polymer particles such as crosslinked silicone resin, crosslinked acrylic resin, crosslinked polystyrene, melamine-formaldehyde resin, aromatic polyamide resin, polyamide-imide resin, crosslinked polyesters and wholly aromatic polyesters, silicon dioxide (silica) and calcium carbonate. Particularly preferred are crosslinked silicone resin particles, silica particles and core-shell type organic particles (core: crosslinked polystyrene, shell: polymethyl methacrylate).

The average particle diameter dB of primary particles of the inert particles B is 10 to 50 nm, preferably 15 to 45 nm. more preferably 18 to 40 nm. When the average particle diameter dB is smaller than 10 nm, the slipperiness of the obtained film may become unsatisfactory and when the average particle diameter dB is larger than 50 nm, the electromagnetic conversion characteristics of the obtained magnetic recording medium may become unsatisfactory.

The inert particles B have a volume shape coefficient (f) represented by the above equation (I) of 0.1 to π/6, preferably 0.2 to π/6, more preferably 0.4 to π/6. The particles having a volume shape coefficient (f) of less than 0.1, for example, flaky particles make it difficult to obtain satisfactory running durability.

The content of the inert particles B is 0.5 to 30 wt %, preferably 2 to 20 wt %, more preferably 3 to 10 wt % based on the solid content of the first coating layer. When the content is lower than 0.5 wt %, the slipperiness of the obtained film may become unsatisfactory and when the content is higher than 30 wt %, the electromagnetic conversion characteristics of the obtained magnetic recording medium may become unsatisfactory.

The total thickness of the laminated thermoplastic resin film which is the second base film of the present invention is generally 2.5 to 20 μm, preferably 3.0 to 10 μm, more preferably 4.0 to 10 μm. The thickness of the thermoplastic resin layer A is preferably ½ or less, more preferably ⅓ or less, particularly preferably ¼ or less of the total thickness of the laminated thermoplastic resin film. The thickness of the thermoplastic resin layer B is preferably ½ or more, more preferably ⅔ or more, particularly preferably ¾ or more of the total thickness of the laminated thermoplastic resin film. The thickness of the coating layer C is generally 1 to 100 nm, preferably 2 to 50 nm, more preferably 3 to 10 nm, particularly preferably 3 to 8 nm.

The laminated thermoplastic resin film of the present invention may be produced by conventionally known methods and methods accumulated in the industry. Out of these, the laminate structure consisting of the thermoplastic resin layer A and the thermoplastic resin layer B is preferably produced by coextrusion and the first coating layer is preferably formed by coating.

For example, in the case of a biaxially oriented polyester film, the thermoplastic resin A which contains the above inert particles D and ester wax finely dispersed therein and the thermoplastic resin B which contains the inert particles E as required are filtered with high accuracy and laminated together in a molten state in an extrusion nozzle or before the nozzle (the former is called "multi-manifold system" and the latter is called "feed block system") to produce a laminate structure having the above preferred thickness ratio which is then coextruded into the form of a film from the nozzle at a temperature of melting point (Tm) to (Tm+70)° C. and solidified by quenching with a cooling roll at 40 to 90° C. to produce an unstretched laminated film. Thereafter, the above unstretched laminated film is stretched to 2.5 to 8.0 times, preferably 3.0 to 7.5 times in a uniaxial direction (longitudinal or transverse direction) at a temperature of (Tg−10) to (Tg+70)° C. (Tg: glass transition temperature of the polyester) and then to 2.5 to 8.0 times, preferably 3.0 to 7.5 times in a direction perpendicular to the above direction (transverse direction when it is first stretched in a longitudinal direction) at a temperature of (Tg) to (Tg+70)° C. in accordance with a commonly used method. The film may be further stretched in a longitudinal direction and/or transverse direction as required. That is, two-stage, three-stage, four-stage or multi-stage orientation may be carried out. The total draw ratio is generally 9 times, preferably 12 to 35 times, more preferably 15 to 30 times.

Further, the above biaxially oriented film is heat set to be crystallized at a temperature of (Tg+70) to (Tm−10)° C., for example, 180 to 250° C. in the case of a polyethylene terephthalate film to provide excellent dimensional stability. The heat setting time is preferably 1 to 60 sec.

To produce a laminated thermoplastic resin film, additives other than the above inert particles, such as a stabilizer, colorant and intrinsic viscosity modifier for a molten polymer may be contained in the thermoplastic resins A and B as required.

The formation of the first coating layer on the thermoplastic resin layer B of the present invention may be carried out by applying an aqueous coating solution.

Coating is carried out on the surface of the thermoplastic resin layer B before it is subjected to the final stretching, and the film is preferably stretched in at least a uniaxial direction after coating. The coating film is dried before or during stretching. Coating is preferably carried out on an unstretched laminated film or longitudinally (uniaxially) stretched laminated film, particularly preferably longitudinally (uniaxially) stretched laminated film. Coating is not particularly limited but roll coating and die coating are used.

The solid content of the above coating solution, particularly aqueous coating solution is preferably 0.2 to 8 wt %, more preferably 0.3 to 6 wt %, particularly preferably 0.5 to 4 wt %. Other components such as a surfactant, stabilizer, dispersant, ultraviolet light absorber and thickener may be added to the coating solution (preferably aqueous coating solution) in limits that do not prevent the effect of the present invention.

In the present invention, to obtain a thin magnetic recording medium having improved properties such as head touch and running durability, the Young's moduli in longitudinal and transverse directions of the laminated film are adjusted to generally 450 kg/mm² or more and 600 kg/mm² or more, preferably 480 kg/mm² or more and 680 kg/mm² or more, more preferably 550 kg/mm or more and 800 kg/mm² or more, particularly preferably 550 kg/mm² or more and 1,000 kg/mm² or more, respectively.

The crystallinity of the thermoplastic resins A and B is desirably 30 to 50% when the thermoplastic resins are polyethylene terephthalate and 28 to 38% when the thermoplastic resins are polyethylene-2,6-naphthalate. Below the lower limit, the thermal shrinkage factor of the film becomes large and above the upper limit, the abrasion resistance of the film degrades and white powders are easily generated upon contact with the surface of a roll or guide pin.

According to the present invention, there are also provided a magnetic recording medium comprising a laminated thermoplastic resin film which comprises the above thermoplastic resin layer A and the above thermoplastic resin layer B formed on one side of the thermoplastic resin layer B as a base film and a magnetic recording medium comprising a laminated thermoplastic resin film which comprises the above thermoplastic resin layers A and B and a first coating layer formed on the side not in contact with the thermoplastic resin layer A of the thermoplastic resin layer B as a base film.

Out of these, preferred is a magnetic recording medium comprising a base film which consists of a laminated thermoplastic resin base film as the second base film of the present invention and the above first coating layer formed on the surface of the first thermoplastic resin layer not in contact with the second thermoplastic resin layer of the base film, and a magnetic layer formed on the first coating layer of the base film.

It should be understood that a description of the first base film is applied to the process for producing a magnetic recording medium from the second base film of the present invention, and the application, magnetic layer used and the like of the magnetic recording medium directly or with modifications obvious to people of ordinary skill in the art.

EXAMPLES

The following examples are provided for the purpose of further illustrating the present invention but are in no way to be taken as limiting. "Parts" and "%" in the Examples and Comparative Examples mean "parts by weight" and "wt %", respectively, unless otherwise stated. Physical property values and characteristic properties in the present invention were measured and defined by the following methods.

(1) Intrinsic Viscosity

This was obtained from a value measured in an orthochlorophenol solvent at 35° C.

(2) Average Particle Diameter (I) of Particles (Average Particle Diameter: 60 nm or more)

This was measured using the CP-50 Centrifugal Particle Size Analyzer of Shimadzu Corporation. The "equivalent sphere diameter" of particles equivalent to 50 mass percent was read from the accumulative curve of the particle diameter and amount of particles of each size calculated from the obtained centrifugal sedimentation curve and taken as average particle diameter (nm) ("Ryudo Sokutei Gijutsu" published by Nikkan Kogyo Shimbunsha., pp. 242-247, 1975).

(3) Average Particle Diameter of Particles (II) (Average Particle Diameter: less than 60 nm)

Particles having an average particle diameter of less than 60 nm which formed small protrusions were measured by a light scattering method. That is, the "equivalent sphere diameter" of particles which accounted for 50% of the total of all the particles obtained by the Nicomp Model 270 Submicron Particle Sizer (trade name) of Nicomp Instruments Inc. was taken as average particle diameter (nm).

(4) Volume Shape Coefficient (f)

A photograph of each particle was taken by a scanning electron microscope at a magnification corresponding to the size of the particle and the maximum diameter (D) ($\mu$m) of the projection plane and the volume (V) ($\mu$m$^3$) of the particle were calculated using the Luzex 500 image analyzer of Nippon Regulator Co., Ltd. to obtain a volume shape coefficient from the following equation (II).

$$f = V/D^3 \tag{II}$$

(5) Density of Protrusions on the Surface and Agglomeration Rate of Particles (a) Base Film The density of protrusions derived from inert fine particles on the surface of the base film was measured by a scanning electron microscope. 20 different photographs of the surface of the base film were taken at a magnification of ×5,000 and an angle of 45° from the surface at random. In the photographs, one protrusion formed by the agglomeration of two or more particles was designated as "agglomeration protrusion" which was distinguished from "independent protrusion" which was formed by a single particle. The "agglomeration protrusions" and the "independent protrusions" in the above surface photographs were counted to obtain the total number of "agglomeration protrusions" and "independent protrusions" per mm$^2$ as the density of protrusions on the surface.

The agglomeration rate of the inert fine particles on the surface of the base film is defined by the following equation (III).

$$\text{agglomeration rate of particles (\%)} = [\text{number of agglomeration protrusions})/(\text{number of agglomeration protrusions+number of independent protrusions})] \times 100 \tag{III}$$

(b) Coating Layer

The density of protrusions derived from inert fine particles on the surface of the coating layer was measured in the same manner as the above measurement of the base film (a) except that 30 surface photographs were taken by a scanning electron microscope from right above at a magnification of ×35,000 at random.

(6) Thickness of Each Layer of Laminated Film and Total Thickness of Film

The total thickness of the film was measured by a micrometer at 10 random points and the mean value of the measurement data was used. As for the thickness of each layer, the thickness of a thin layer was measured by the following method and the thickness of a thick layer was obtained by subtracting the thickness of the thin layer and the thickness of the coating layer from the total thickness of the film. That is, using a secondary ion mass spectrometer (SIMS), the concentration ratio (M$^+$/C$^+$) of a metal element (M$^+$) derived from particles having the highest concentration out of particles contained in the film of a portion from the surface layer to a depth of 5,000 nm excepting the coated layer to the hydrocarbon (C$^+$) of the thermoplastic resin (polyester) was taken as the concentration of particles, and the portion from the surface to a depth of 5,000 nm was analyzed in the thickness direction. The particle concentration of the surface layer was low because the surface was an interface but became higher as the distance from the surface increased. In the present invention, after the particle concentration became a stable value of 1, it became a stable value of 2 or simply decreased. Based on this distribution curve, a depth where the particle concentration became (stable value 1+stable value 2)/2 in the former case and a depth where the particle concentration became (stable value 1)/2 (this value is larger than the depth which gives a stable value of 1) in the latter case were taken as the thickness ($\mu$m) of the thin layer.

Measurement conditions are as follows.

(a) Measurement Apparatus secondary ion mass spectrometer (SIMS); 6300 of Perkin Elmer Inc.

(b) Measurement Conditions type of primary ions: O$^{2+}$ primary ion acceleration voltage: 12 kV primary ion current: 200 nA luster area: 400 $\mu$m□ analytical area: 30% of gate measurement vacuum degree: 6.0×10$^{-9}$ Torr

E-GUNN: 0.5 KV–3.0 A

When particles which are contained the most in an area from the surface layer to a depth of 5,000 nm are organic polymer particles other than silicone resin, it is difficult to measure them with SIMS. Therefore, a concentration distribution curve similar to the above curve was measured by FT-IR (Fourier Transform Infrared Spectrometry) or XPS (X-ray photoelectron spectrometry) depending on the particles while etching from the surface to obtain the thickness ($\mu$m) of each layer.

(7) Thickness of Coating Layer

A small piece of the film was fixed using an epoxy resin and a super thin piece having a thickness of about 600 Å was prepared by a microtome (cut in a direction parallel to the running direction of the film). This sample was observed through a transmission electron microscope (H-800 of Hitachi, Ltd.) and the boundary of the coating layer was located to obtain the thickness (nm) of the coating layer.

(8) Contact Angle

This was measured using the contact angle measuring instrument of Kyowa Chemical Co., Ltd. The film sample was left at a temperature of 25° C. and a humidity of 50% for 24 hours, 5 mg of distilled water was dropped onto the film, and a photograph of the film sample was taken from a horizontal direction after 20 seconds. The angle formed by the film and the tangent of the water drop in the direction of the water drop was taken as contact angle (°).

(9) Film Surface Roughness (Ra)

The surface roughness (Ra) is a value defined as center line average roughness (Ra) by JIS-B0601 and was measured using the tracer type surface roughness meter (Surfcorder SE-30C) of Kosaka Kenkyusho Co., Ltd. in the present invention. The measurement conditions are as follows.

(a) radius of the end of tracer: 2 μm
(b) measurement pressure: 30 mg
(c) cut-off: 0.08 mm
(d) measurement length: 1.0 mm
(e) data compilation: The surface roughness of the same sample was measured 5 times, the largest value was excluded, and the mean value of the four other data was obtained by rounding to four decimal places.

(10) Center Plane Average Roughness (Surface Roughness) (WRa)

Using the non-contact 3-Droughness meter under the trade name of TOPO-3D of WYKO Co., Ltd., the surface roughness was measured under such conditions as a measurement area of 242 μm×239 μm (0.058 mm$^2$) and a measurement magnification of ×40 to obtain the profile of surface roughness (original data). The center plane average roughness (WRa) defined by the following equations (IV) and (V) was obtained by surface analysis based on software incorporated in the above roughness meter.

$$WRa = \sum_{k=1}^{M} \sum_{j=1}^{N} |Z_{jk} - \overline{Z}|/(M \cdot N) \quad \text{(IV)}$$

provided $$\overline{Z} = \sum_{k=1}^{M} \sum_{j=1}^{N} Z_{jk}/(M \cdot N) \quad \text{(V)}$$

$M = 256$ $N = 256$ $Z_{jk}$ is a height on a 3-Droughness chart at a j-th position and a k-th position in a measurement direction (242 μm) and a direction perpendicular to the measurement direction (239 μm) when these directions are divided into M and N sections, respectively.

(11) Young's Modulus

A sample film having a length of 300 mm and a width of 12.7 mm was pulled by the Tensilon tensile tester of Toyo Baldwin Co., Ltd. at a strain rate of 10%/min in a room maintained at a temperature of 20° C. and a humidity of 50% and the Young's modulus was calculated from the following equation (VI) using the first linear portion of a tensile stress-strain curve:

$$E = \Delta\sigma/\Delta\epsilon \quad \text{(VI)}$$

wherein E is a Young's modulus (kg/mm$^2$), Δσ is a stress difference between two points on a straight line caused by the original average sectional area, and An is a strain difference between the above two points.

(12) Blocking Peel Force of Second Base Film

The second thermoplastic resin layer of a film sample having a length of 100 mm and a width of 200 mm obtained from a rolled film was subjected to a corona treatment at a room temperature of 20±2° C. and a humidity of 40±5%.

The above corona treatment was carried out using the "CG-102" (trade name) high-frequency power supply of Kasuga Denki Kabushiki Kaisha under the following conditions.

current: 4.5 A distance between electrodes: 1.0 mm treatment time: treating at a speed of 1.2 m/min by passing between electrodes The treated side of the film was brought into contact with the opposite side to the second thermoplastic resin layer of the film and aged at a pressure of 100 kg/cm$^2$, a temperature of 60° C. and a humidity of 80% for 17 hours, and the peel force per 100 mm in width of the film was obtained using the above "Tensilon" (trade name) tensile tester.

(13) Winding Properties

After winding conditions at the time of slitting were optimized, 30 rolls of films having a width of 600 mm and a length of 12,000 m were slit at a speed of 100 m/min and rolls without debris, protrusions and wrinkles on the surface of the film after slitting were accepted. The winding properties of the rolls were evaluated based on the following criteria.

⊚; 28 or more accepted rolls

○; 25 to 27 accepted rolls

X; 16 to 24 accepted rolls

X X; 15 or less accepted rolls

(14) Back Coat Applicability (Processability)

In the production process of a magnetic tape, the surface of the second thermoplastic resin layer after the application of a back coat was observed visually and evaluated based on the following criteria.

○; coating nonuniformity and repellence are not observed in the back coat layer

X; coating nonuniformity or repellence is observed in the back coat layer

(15) Production of Magnetic Tape and Evaluation of Characteristic Properties Two 100% cobalt ferromagnetic thin film layers were formed on the flat surface of the film of the present invention to a thickness of 0.2 μm (about 0.1 μm of each layer) by vacuum vapor deposition. Then, a diamond-like carbon (DLC) film and a fluorine-containing carboxylic acid-based lubricant layer were further formed on the surface of the layers sequentially and a back coat layer was formed on the side opposite to the ferromagnetic thin film layer side of the film by a known method. Thereafter, the obtained laminated film was slit to a width of 8 mm and loaded in a commercially available 8 mm video cassette. Then, the characteristic properties of the obtained tape were measured by using the following commercially available devices.

used devices 8 mm video tape recorder: EDV-6000 of Sony Corporation

C/N measurement: noise meter of Shibasoku Co., Ltd.

(a) C/N Measurement (Electromagnetic Conversion Characteristics)

A signal having a recording wavelength of 0.5 μm (frequency of about 7.4 MHz) was recorded and the ratio of 6.4 MHz and 7.4 MHz reproduction signals thereof was taken as C/N of the tape which was expressed as a relative value to C/N of a commercially available 8 mm video deposited tape which was taken as 0 dB.

(b) Running Durability

After recording and reproduction were repeated 1,000 times at a temperature of 40° C., a humidity of 80% and a tape running speed of 85 cm/min, C/N was measured and the deviation from the initial value was evaluated based on the following criteria.

⊚: more than +0.0 dB from the reference value

○: −1.5 to +0.0 dB from the reference value

X: less than −1.5 dB from the reference value

(16) Measurement of pH pH at a solvent temperature of 25° C. was measured using the F-14 pH meter of Horiba Co., Ltd.

Example 1

100 parts of dimethyl terephthalate, 70 parts of ethylene glycol, 35 mmol % based on dimethyl terephthalate of calcium acetate and 35 mmol % based on the above standard of magnesium acetate were added to carry out an ester exchange reaction in accordance with a commonly used method, trimethyl phosphate was added in an amount of 40 mmol % based on dimethyl terephthalate to terminate the ester exchange reaction. An ethylene glycol slurry containing globular silica having an average particle diameter of 45 nm and a pH of 9 as the first inert fine particles (inert particles A) was added right after the end of the ester exchange reaction to ensure that the content of the globular silica in the polymer should become 0.03%. Thereafter, titanium trimellitate was added in an amount of 2 mmol % based on dimethyl terephthalate and the resulting mixture was transferred to a polymerizer to carry out a polycondensation reaction under a high vacuum of 26.7 Pa or less in accordance with a common used method by elevating the temperature to 290° C. to produce polyethylene terephthalate having an intrinsic viscosity of 0.60.

A pellet of the obtained polyethylene terephthalate was dried at 170° C. for 3 hours, supplied into the hopper of an extruder, molten at 300° C., filtered by a copper wire filter having an average opening of 11 μm with high accuracy, melt extruded through a slit die, subjected to a surface finish of about 0.3 S using a linear electrode, and contact solidified on a rotary cooling drum having a surface temperature of 20° C. to obtain a 89 μm-thick unstretched film.

The obtained unstretched film was preheated, stretched to 3.3 times between low-speed and high-speed rolls at a film temperature of 100° C. and quenched, and aqueous solutions having the following compositions (total solid content of 1.0%) were applied to the front side and rear side of this longitudinally stretched film by kiss coating.

(a) Front Side (First Coating Layer)

binder: acryl modified polyester (IN-170-6 of Takamatsu Yushi Co., Ltd.); 68 parts (in terms of solid content)

second inert fine particles (inert particles B): core-shell filler (core; crosslinked polystyrene, shell; polymethyl methacrylate) (average particle diameter of 30 nm) (volume shape coefficient of 0.47) (SX8721(D)-12 of JSR Corporation); 5 parts surfactant X: (Nonion NS-208.5 of NOF Corporation); 1 part surfactant Y: (Nonion NS-240 of NOF Corporation); 26 parts thickness (after drying): 4 nm (b) Rear Side (Second Coating Layer)

copolyester (terephthalic acid/isophthalic acid/5-sodium sulfoisophthalic acid/ethylene glycol/bisphenol A adduct with 2 mols of propionoxide=97/1/2/60/40); 60 parts inert particles C: silica particles (average particle diameter of 60 nm); 10 parts hydroxypropyl methylcellulose; 20 parts surfactant X : (Nonion NS-208.5 of NOF Corporation); 10 parts thickness (after drying): 15 nm Subsequently, the stretched film was supplied to a stenter to be stretched to 4.2 times in a transverse direction at 120° C. The obtained biaxially oriented film was heat set with 220° C. hot air for 4 seconds to obtain a polyester film having a total thickness of 6.4 μm. The density of protrusions derived from the inert particles A on the surface of the film was 42,000/mm$^2$ and the agglomeration rate of the inert particles A was 15%. The biaxially oriented film had a surface roughness (Ra) of the front side (first coating layer) of 0.7 nm, a surface roughness of the rear side (second coating layer) of 6 nm, a Young's modulus in a longitudinal direction of 500 kg/mm$^2$, a Young's modulus in a transverse direction of 700 kg/mm$^2$, and a density of protrusions derived from the inert particles B on the surface of the front side (first coating layer) of 11,000,000/mm. Other characteristic properties of this film and the characteristic properties of a ferromagnetic thin film deposited magnetic tape obtained from this film are shown in Table 2. In the production of the ferromagnetic thin film deposited magnetic tape, the flat surface (first coating layer) was a deposition surface.

Examples 2 and 4

Polyester films were obtained in the same manner as in Example 1 except that the type, average particle and amount of the inert particles A were changed as shown in Table 1. The obtained polyester film in Example 2 had a surface roughness (Ra) of the front side of 0.8 nm and a surface roughness of the rear side of 6.5 nm, and the obtained polyester film in Example 4 had a surface roughness of the front side of 1.0 nm and a surface roughness of the rear side of 6.7 nm. The characteristic properties of the obtained films and ferromagnetic thin film deposited magnetic tapes obtained from the films are shown in Table 2.

Example 3

Dimethyl terephthalate and ethylene glycol were polymerized by adding manganese acetate as an ester exchange catalyst, antimony trioxide as a polymerization catalyst and phosphorous acid as a stabilizer in accordance with a commonly used method. Silicone particles having an average particle diameter of 0.7 μm and θ-alumina particles having an average particle diameter of 0.2 μm were added as the third inert fine particles (inert particles D) to ensure that the final contents of the particles in the polymer should become 0.05% and 0.3%, respectively. Polyethylene terephthalate (PET) (resin D1) for the second polyester layer having an intrinsic viscosity of 0.60 was obtained by polymerization.

The polyethylene terephthalate (to be referred to as "resin A1" hereinafter) used in Example 1 and the resin D1 were dried at 170° C. for 3 hours, supplied to two extruders, molten at 300° C. and laminated together using a multi-manifold coextrusion die in such a manner that the resin D1 layer was formed on one side of the resin A1 layer and quenched to obtain a 89 μm-thick unstretched laminated film.

The obtained unstretched film was preheated, stretched to 3.3 times between low-speed and high-speed rolls at a film temperature of 100° C. and quenched, and the coating solution used for the front side in Example 1 was applied to the front side (resin A1 layer side) of the longitudinally stretched film to form a first coating layer. Subsequently, the stretched film was supplied to a stenter to obtain a laminated polyester film having a total thickness of 6.4 μm in the same manner as in Example 1. The obtained film had a surface roughness (Ra) of the front side (first coating layer) of 1.7 nm and a surface roughness of the rear side (resin D1 layer side) of 7.8 nm, a Young's modulus in a longitudinal direction of 500 kg/mm$^2$ and a Young's modulus in a transverse direction of 700 kg/mm$^2$. The thickness of the resin D1 layer was 0.9 μm. The characteristic properties of the obtained film and a ferromagnetic thin film deposited magnetic tape obtained from the film are shown in Table 2.

Examples 5 and 6

Polyethylene-2,6-naphthalate (polyethylene-2,6-naphthalene dicarboxylate) (PEN) (resin A2, resin D2) for forming two layers was obtained in the same manner as the polyester production process in Example 1 except that the type, average particle diameter and amount of the inert particles A were changed as shown in Table 1 and the equimolar amount of dimethyl 2,6-naphthalene dicarboxylate was used in place of dimethyl terephthalate.

The obtained resin A2 and resin D2 were dried at 170° C. for 6 hours and the thickness of each layer was adjusted in the same manner as in Example 3 to obtain an unstretched laminated film consisting of the resin A2 layer and the resin D2 layer. The obtained unstretched film was preheated, stretched to 3.6 times between low-speed and high-speed rolls at a film temperature of 135° C. and quenched, and aqueous solutions having the following compositions were applied to the front side (resin A2 layer side) and the rear side (resin D2 layer side) of the longitudinally stretched film in the same manner as in Example 1 to form a first coating layer and a second coating layer.

(a) Front Side (First Coating Layer)

binder: acryl modified polyester (IN-170-6 of Takamatsu Yushi Co., Ltd.); 63 parts (in terms of solid content)

inert particles B: acrylic filler (average particle diameter of 25 nm) (volume shape coefficient of 0.42) (MA02W of Nippon Shokubai Co., Ltd.); 6.5 parts surfactant X: (Nonion NS-208.5 of NOF Corporation); 0.5 part surfactant Y: (Nonion NS-270 of NOF Corporation); 20 parts thickness (after drying): 6 nm (b) Rear Side (Second Coating Layer)

acryl modified polyester (SH551BK of Takamatsu Yushi Co., Ltd.); 50 parts fourth inert fine particles (inert particles C): acrylic resin filler (average particle diameter of 40 nm) (ME-6U of Nippon Shokubai Co., Ltd.); 15 parts hydroxypropylmethyl cellulose; 15 parts surfactant X: (Nonion NS-208.5 of NOF Corporation); 10 parts siloxane copolymerized acryl (X22-8053 of Shin-Etsu Chemical Co., Ltd.); 10 parts thickness (after drying): 20 nm Subsequently, the film was supplied to a stenter to be stretched to 4.9 times in a transverse direction at 150° C. and heat set while further stretched to 1.14 times in a transverse direction at 200° C. to obtain a biaxially oriented film having a total thickness of 4.4 μm. This film had a surface roughness (Ra) of the front side (first coating layer) of 0.6 nm and a surface roughness of the rear side (second coating layer) of 6.2 nm in Example 5, a surface roughness of the front side (first coating layer) of 0.5 nm and a surface roughness of the rear side (second coating layer) of 6.2 nm in Example 6, a Young's modulus in a longitudinal direction of 560 kg/mm$^2$, a Young's modulus in a transverse direction of 1,100 kg/mm$^2$, a density of protrusions derived from the inert particles B on the surface of the front side (first coating layer) of 10,500,000/mm in Example 5 and 10,500,000/mm in Example 6. Other characteristics properties of these films and the characteristic properties of ferromagnetic thin film deposited magnetic tapes obtained from these films are shown in Table 2.

TABLE 1

| Example | 1 | 2 | 3 | 4 | 5 | 6 |
| --- | --- | --- | --- | --- | --- | --- |
| polyester film layer resin[*1] | PET | PET | PET | PET | PEN | PEN |
| inert particles A | silica | silica | silica | silicone | crosslinked polystyrene | silica |
| average particle diameter (nm) | 45 | 80 | 60 | 100 | 70 | 60 |
| volume shape coefficient | 0.5 | 0.5 | 0.5 | 0.5 | 0.45 | 0.5 |
| amount (%) | 0.030 | 0.025 | 0.030 | 0.050 | 0.015 | 0.020 |
| inert particles B | core-shell | core-shell | core-shell | core-shell | acrylic filler | acrylic filler |

TABLE 1-continued

| Example | 1 | 2 | 3 | 4 | 5 | 6 |
|---|---|---|---|---|---|---|
| average particle diameter (nm) | 30 | 30 | 30 | 30 | 25 | 25 |
| volume shape coefficient | 0.47 | 0.47 | 0.47 | 0.47 | 0.42 | 0.42 |
| amount (%) | 5 | 5 | 5 | 5 | 6.5 | 6.5 |
| inert particles C | silica | silica | — | silica | acrylic filler | acrylic filler |
| average particle diameter (nm) | 60 | 60 | — | 60 | 40 | 40 |
| amount (%) | 10 | 10 | — | 10 | 15 | 15 |
| layer thickness (nm) | 15 | 15 | — | 15 | 20 | 20 |
| inert particles D | — | — | silicone/alumina | — | silicone/alumina | silicone/alumina |
| average particle diameter ($\mu$m) | — | — | 0.7/0.2 | — | 0.7/0.2 | 0.7/0.2 |
| amount (%) | — | — | 0.05/0.3 | — | 0.05/0.3 | 0.05/0.3 |
| layer thickness ($\mu$m) | — | — | 0.9 | — | 0.9 | 0.9 |

TABLE 2

| Example | 1 | 2 | 3 | 4 | 5 | 6 |
|---|---|---|---|---|---|---|
| film characteristic properties | | | | | | |
| density of protrusions on the surface of polyester layer (unit: 10,000/mm$^2$) | 4.2 | 2.1 | 3.5 | 2.3 | 3.0 | 2.5 |
| agglomeration rate of particles (%) | 15 | 8 | 10 | 12 | 7 | 13 |
| density of protrusions on the surface of first coating layer (unit: 10,000/mm$^2$) | 1,100 | 1,100 | 1,100 | 1,100 | 1,050 | 1,050 |
| surface roughness (Ra) (nm) | | | | | | |
| magnetic layer (front) side | 0.7 | 0.8 | 1.7 | 1.0 | 0.6 | 0.5 |
| book (rear) side | 6 | 6.5 | 7.8 | 6.7 | 6.2 | 6.2 |
| tape characteristic properties | | | | | | |
| electromagnetic conversion characteristics (dB) | +7.3 | +3.4 | +6.5 | +1.0 | +4.5 | +7.2 |
| running durability | ○ | ○ | ⊚ | ⊚ | ○ | ○ |

Comparative Example 1

A polyester film was obtained in the same manner as in Example 1 except that the inert particles A were not added. This film had a surface roughness (Ra) of the front side (first coating layer) of 0.6 nm and a surface roughness of the rear side (second coating layer) of 6.2 nm. Other characteristic properties of this film and the characteristic properties of a ferromagnetic thin film deposited magnetic tape obtained from this film are shown in Table 4. The magnetic tape obtained from this film was inferior in running durability.

Comparative Example 2

A polyester film was obtained in the same manner as in Example 2 except that the pH of the ethylene glycol slurry of the inert particles A was changed to 7 and the amount of trimethyl phosphate was changed to 15 mmol %. The characteristic properties of this film and the characteristic properties of a ferromagnetic thin film deposited magnetic tape obtained from this film are shown in Table 4. The magnetic tape obtained from this film was inferior in running durability.

Comparative Example 3

A polyester film was obtained in the same manner as in Example 5 except that the type, average particle diameter and amount of the inert particles A were changed as shown in Table 3 and the pH of the ethylene glycol slurry of the inert particles A was changed to 12. The characteristic properties of this film and the characteristic properties of a ferromagnetic thin film deposited magnetic tape obtained from this film are shown in Table 4. The agglomeration rate of the inert particles A of this film was extremely high and the magnetic tape obtained from this film was inferior in electromagnetic conversion characteristics.

Comparative Example 4

A polyester film was obtained in the same manner as in Example 5 except that the type, average particle diameter and amount of the inert particles A were changed as shown in Table 3. The characteristic properties of this film and the characteristic properties of a ferromagnetic thin film deposited magnetic tape obtained from this film are shown in Table 4. The obtained film had a high density of protrusions and the magnetic tape obtained from this film was inferior in electromagnetic conversion characteristics.

As is obvious from Tables 1 to 4, the magnetic tapes obtained from the films of the present invention have excellent electromagnetic conversion characteristics and running durability whereas the magnetic tapes obtained from the films which fall outside the scope of the present invention are inferior in the above properties.

TABLE 3

| Comparative Example | 1 | 2 | 3 | 4 |
|---|---|---|---|---|
| polyester film layer resin*1 | PET | PET | PEN | PEN |
| inert particles A | — | silica | silica | silica |
| average particle diameter (nm) | — | 80 | 40 | 60 |
| volume shape coefficient | — | 0.5 | 0.5 | 0.5 |
| amount (%) | — | 0.025 | 0.040 | 0.070 |

TABLE 3-continued

| Comparative Example | 1 | 2 | 3 | 4 |
|---|---|---|---|---|
| inert particles B | core-shell | core-shell | acrylic filler | acrylic filler |
| average particle diameter (nm) | 30 | 30 | 25 | 25 |
| volume shape coefficient | 0.47 | 0.47 | 0.42 | 0.42 |
| amount (%) | 5 | 5 | 6.5 | 6.5 |
| inert particles C | silica | silica | acrylic filler | acrylic filler |
| average particle diameter (nm) | 60 | 60 | 40 | 40 |
| amount (%) | 10 | 10 | 15 | 15 |
| layer thickness (nm) | 15 | 15 | 20 | 20 |
| inert particles D | — | — | silicone/alumina | silicone/alumina |
| average particle diameter ($\mu$m) | — | — | 0.7/0.2 | 0.7/0.2 |
| amount (%) | | | 0.05/0.3 | 0.05/0.3 |
| layer thickness ($\mu$m) | — | — | 0.9 | 0.9 |

TABLE 4

| Comparative Example | 1 | 2 | 3 | 4 |
|---|---|---|---|---|
| film characteristic properties | | | | |
| density of protrusions on the surface of polyester film layer (unit: 10,000/mm$^2$) | — | 2.3 | 3.8 | 8.5 |
| agglomeration rate of particles (%) | — | 1 | 30 | 10 |
| density of protrusions on the surface of first coating layer (unit: 10,000/mm$^2$) | 1,100 | 1,100 | 1,050 | 1,050 |
| surface roughness (Ra) (nm) | | | | |
| magnetic layer (front) side | 0.6 | 0.8 | 1.9 | 2.0 |
| book (rear) side | 6.2 | 0.5 | 6.2 | 6.2 |
| tape characteristic properties | | | | |
| electromagnetic conversion characteristics (dB) | +8.0 | +3.8 | −1.5 | −1.0 |
| running durability | x | x | ○ | ○ |

In Tables 1 and 3, * 1) PET stands for polyethylene terephthalate and PEN for polyethylene-2,6-naphthalate (polyethylene-2,6-naphthalene dicarboxylate) (the same shall apply to Tables-5 and 7).

The first base film of the present invention is a polyester film for magnetic recording media which is excellent in electromagnetic conversion characteristics, particularly in running durability and has a small reduction in output at the time of repeated use.

Examples 7 to 12 and Comparative Example 5 to 9 of the second base film of the present invention are given below. The inert particles D, E and ester wax used in these Examples and Comparative Examples are as follows.

The following substances were used as the inert particles D.
  spherical silica; average particle diameter of 600 nm
  globular silica; average particle diameter of 400 nm
  θ-type alumina; average particle diameter of 60 nm
  silicone; average particle diameter of 500 nm
  crosslinked polystyrene; average particle diameter of 800 nm
  vaterite crystal-based calcium carbonate; average particle diameter of 200 nm The following substances were used as the inert particles E.
  spherical silica; average particle diameter of 200 nm (volume shape coefficient; 0.5)
  globular silica; average particle diameter of 60 nm (volume shape coefficient; 0.5)

The following substances were used as the ester wax.
  (a-1); sorbitan tristearate (melting point of 55° C.)
  (a-2); product obtained by saponifying a montanic acid diol ester with calcium hydroxide, "Wax E" (trade name) of Hoechst AG (melting point of 86° C.)
  (a-3); glycerin tripalmitate
  (a-4); product obtained by saponifying a montanic acid diol ester with calcium hydroxide, "Wax OP" (tradename) of Hoechst AG (melting point of 81° C.)
  (a-5); pentaerythritol tribehenate Example 7

Dimethyl terephthalate and ethylene glycol were polymerized by adding manganese acetate as an ester exchange catalyst, titanium trimellitate as a polymerization catalyst, phosphorous acid as a stabilizer and 0.03% of globular silica having an average particle diameter of 60 nm and a volume shape coefficient of 0.5 as a lubricant (inert particles E) to the resin in accordance with a commonly used method to obtain polyethylene terephthalate (resin Bi) for the first thermoplastic resin layer (thermoplastic resin layer B) having an intrinsic viscosity of 0.60.

Further, dimethyl terephthalate and ethylene glycol were polymerized in the same manner as described above by adding spherical silica having an average particle diameter of 600nm and θ-type alumina having an average particle diameter of 60 nm as lubricants (third inert particles or inert particles D) to the resin in amounts of 0.12% and 0.2%, respectively, in accordance with a commonly used method to obtain polyethylene terephthalate having an intrinsic viscosity of 0.60.

0.3% of powder of sorbitan tristearate (melting point of 55° C.) (a-1)) was dispersed in 99.7% of the obtained polyethylene terephthalate and kneaded by a vented double-screw extruder to obtain polyethylene terephthalate (resin A1) for the second thermoplastic resin layer (thermoplastic resin layer A) having an intrinsic viscosity of 0.59.

The obtained resins A1 and B1 were dried at 170° C. for 3 hours, supplied to two extruders, molten at 280 to 300° C., filtered by a steel wire filter having an average opening of 11 $\mu$m with high accuracy and laminated together using a multi-manifold coextrusion die in such a manner that the resin layer B was formed on one side of the resin layer A and quenched to obtain a 89 $\mu$m-thick unstretched laminated thermoplastic resin film.

The obtained unstretched film was preheated, stretched to 3.3 times between low-speed and high-speed rolls at a film temperature of 100° C. and quenched to obtain a longitudinally stretched film. An aqueous coating solution having the following composition (in terms of solid content) (total solid content of 1.0%) was applied to the layer B side of the longitudinally stretched film by kiss coating to form a first coating layer.
  binder: acryl modified polyester (IN-170-6 of Takamatsu Yushi Co., Ltd.), 67%
  second inert particles (inert particles B): acrylic filler (average particle diameter of 30 nm) (volume shape coefficient of 0.40) (MA02W of Nippon Shokubai Co., Ltd.), 6%
  surfactant X: (Nonion NS-208.5 of NOF Corporation), 1%
  surfactant Y: (Nonion NS-240 of NOF Corporation), 26%
  thickness of first coating layer (after drying): 5 nm Subsequently, the film was supplied to a stenter to be stretched to 4.2 times in a transverse direction at 110° C. The obtained biaxially oriented film was heat set with 220° C. hot air for 4 seconds to obtain a laminated biaxially oriented polyester film having a total thickness of 6.4 μm and a base layer (thermoplastic resin layer A) thickness of 1.0 μm. The thicknesses of the thermoplastic resin layers A and B of this film were adjusted by the delivery rates of the two extruders. This film had a surface roughness WRa of the thermoplastic resin layer B of 1.7 nm, a Young's modulus in a longitudinal direction of 500 kg/mm$^2$ and a Young's modulus in a transverse direction of 700 kg/mm$^2$. Other characteristic properties of this laminated film and the characteristic properties of a ferromagnetic thin film deposited magnetic tape obtained from this film are shown in Table 6.

Examples 8 and 10

Laminated thermoplastic resin films were obtained in the same manner as in Example 7 except that the type, average particle diameter and amount of the inert particles D to be contained in the thermoplastic resin layer A and the type and amount of the (partly saponified) ester wax were changed as shown in Table 5 and particles were not contained in the first thermoplastic resin. The characteristic properties of the obtained films and the characteristic properties of ferromagnetic thin film deposited magnetic tapes obtained from the films are shown in Table 6.

Example 9

A laminated thermoplastic resin film was obtained in the same manner as in Example 7 except that the type, average particle diameter and amount of the inert particles D to be contained in the thermoplastic resin layer A were changed as shown in Table 5 and the inert particles B to be contained in the first coating layer was changed to the "SX8721(D)-12" (trade name) core-shell filler (core; crosslinked polystyrene, shell; polymethyl methacrylate) (average particle diameter; 30 nm, volume shape coefficient; 0.45) of JSR Corporation. The characteristic properties of the obtained film and the characteristic properties of a ferromagnetic thin film deposited magnetic tape obtained from the film are shown in Table 6.

Examples 11 and 12

Polyethylene-2,6-naphthalate (PEN) (resins A2 and B2) for the thermoplastic resin layers A and B was obtained in the same manner as in Example 7 except that the type, average particle diameter and amount of the inert particles D to be contained in the thermoplastic resin layer A and the type and amount of the (partly saponified) ester wax were changed as shown in Table 5 and the equimolar amount of dimethyl 2,6-naphthalene dicarboxylate was used in place of dimethyl terephthalate.

The resins A2 and B2 were dried at 170° C. for 6 hours and the thickness of each layer was adjusted in the same manner as in Example 7 to obtain a 89 μm-thick unstretched laminated thermoplastic resin film.

The obtained unstretched film was preheated, stretched to 3.6 times between low-speed and high-speed rolls at a film temperature of 135° C. and quenched to obtain a longitudinally stretched film. An aqueous coating solution (total solid content of 1.0%) having composition shown in Table 5 (in terms of solid content) was applied to the layer B side of the longitudinally stretched film in the same manner as in Example 7.

Subsequently, the film was supplied to a stenter to be stretched to 5.7 times in a transverse direction at 155° C. The obtained biaxially oriented film was heat set with 200° C. hot air for 4 seconds to obtain a laminated biaxially oriented polyester film having a total thickness of 4.4 μm and a base layer (thermoplastic resin layer A) thickness of 0.6 μm. The thicknesses of the thermoplastic resin layers A and B of this film were adjusted by the delivery rates of the two extruders. In Example 11, this film had a surface roughness WRa of the thermoplastic resin layer B of 0.9 nm, a Young's modulus in a longitudinal direction of 550 kg/mm$^2$ and a Young's modulus in a transverse direction of 1,050 kg/mm$^2$. In Example 12, the film had a surface roughness WRa of the thermoplastic resin layer B of 1.1 nm, a Young's modulus in a longitudinal direction of 550 kg/mm$^2$ and a Young's modulus in a transverse direction of 1,050 kg/mm$^2$. Other characteristic properties of the laminated films and the characteristic properties of ferromagnetic thin film deposited magnetic tapes obtained from the films are shown in Table 6.

TABLE 5

| Example | 7 | 8 | 9 | 10 | 11 | 12 |
|---|---|---|---|---|---|---|
| polyester film layer resin*1 | PET | PET | PET | PET | PEN | PEN |
| inert particles D | silica/alumina | silicone | crosslinked polystyrene | vaterite crystal-based calcium carbonate | silicone | silica |
| average particle diameter (nm) | 600/60 | 500 | 800 | 200 | 500 | 400 |
| amount (%) | 0.12/0.2 | 0.10 | 0.05 | 2.00 | 0.05 | 0.08 |
| wax | a-1 | a-2 | a-3 | a-4 | a-1 | a-5 |
| amount (%) | 0.30 | 0.30 | 0.20 | 0.10 | 0.50 | 0.30 |
| inert particles E | globular silica | — | globular silica | — | globular silica | globular silica |
| average particle diameter (nm) | 60 | — | 60 | — | 60 | 60 |
| volume shape coefficient | 0.5 | — | 0.5 | — | 0.5 | 0.5 |
| amount (%) | 0.03 | — | 0.03 | — | 0.03 | 0.03 |
| inert particles B | acrylic filler | acrylic filler | core-shell filler | acrylic filler | acrylic filler | acrylic filler |
| average particle diameter (nm) | 30 | 30 | 30 | 30 | 30 | 30 |
| volume shape coefficient | 0.40 | 0.40 | 0.45 | 0.40 | 0.40 | 0.40 |
| amount (%) | 6 | 6 | 6 | 6 | 6 | 6 |
| layer thickness (nm) | 5 | 6 | 5 | 5 | 5 | 5 |

TABLE 6

| Example | 7 | 8 | 9 | 10 | 11 | 12 |
|---|---|---|---|---|---|---|
| characteristic properties of film | | | | | | |
| water contact angle of layer A (°) | 78 | 86 | 78 | 74 | 84 | 80 |
| surface roughness of layer B (nm) | 1.7 | 1.1 | 1.3 | 1.2 | 0.9 | 1.1 |
| blocking peel force | 5 | 4 | 7 | 10 | 3 | 4 |
| winding properties | ⊚ | ○ | ⊚ | ○ | ⊚ | ⊚ |
| back coat applicability | ○ | ○ | ○ | ○ | ○ | ○ |
| characteristic properties of tape | | | | | | |
| electromagnetic conversion characteristics (dB) | +8 | +9 | +7 | +10 | +9 | +8 |

Comparative Example 5

A laminated thermoplastic resin film was obtained in the same manner as in Example 7 except that the (partly saponified) ester wax was not contained in the thermoplastic resin layer A. The obtained film was firmly adhered and broken when it was forcedly separated to measure its blocking peel force. Other characteristic properties of the film and the characteristic properties of a ferromagnetic thin film deposited magnetic tape obtained from the film are shown in Table 8.

Comparative Example 6

A laminated thermoplastic resin film was obtained in the same manner as in Example 7 except that the amount of sorbitan tristearate (a-1) was changed to 12%. Repellence is observed on the back coat of the obtained film at coating a back coating in the step of producing a magnetic tape. Therefore, ordinary coating could not be performed. Other characteristic properties of the film and the characteristic properties of a ferromagnetic thin film deposited magnetic tape obtained from the film are shown in Table 8

Comparative Example 7

A laminated thermoplastic resin film was obtained in the same manner as in Example 7 except that 0.2% of spherical silica having an average particle diameter of 200 nm (volume shape coefficient; 0.5) were added as the inert particles E to be contained in the thermoplastic resin layer B. The obtained film was inferior in electromagnetic conversion characteristics because the surface roughness WRa of the thermoplastic resin layer B was outside the range of the present invention. Other characteristic properties of the film and the characteristic properties of a ferromagnetic thin film deposited magnetic tape obtained from the film are shown in Table 8.

Comparative Example 8

A laminated thermoplastic resin film was obtained in the same manner as in Example 11 except that the inert particles D were not contained in the thermoplastic resin layer A. Since the film was firmly adhered when its blocking peel force was to be measured, the measurement could not be made. Other characteristic properties of the film and the characteristic properties of a ferromagnetic thin film deposited magnetic tape obtained from the film are shown in Table 8.

Comparative Example 9

A laminated thermoplastic resin film was obtained in the same manner as in Example 11 except that 0.2% of sorbitan monoacetate was contained in the thermoplastic resin layer B. Since the film was firmly adhered when its blocking peel force was to be measured, the measurement could not be made. Other characteristic properties of the film and the characteristic properties of a ferromagnetic thin film deposited magnetic tape obtained from the film are shown in Table 8.

TABLE 7

| Comparative Example | 5 | 6 | 7 | 8 | 9 |
|---|---|---|---|---|---|
| polyester film layer resin[*1] | PET | PET | PET | PEN | PEN |
| inert particles D | silica/alumina | silica/alumina | silica/alumina | — | silicone |
| average particle diameter (nm) | 600/60 | 600/60 | 600/60 | — | 500 |
| amount (%) | 0.12/0.2 | 0.12/0.2 | 0.12/0.2 | — | 0.05 |
| wax | — | a-1 | a-1 | a-1 | a-1 |
| amount (%) | — | 12.00 | 0.30 | 0.50 | 0.50 |
| inert particles E | globular silica | globular silica | spherical silica | globular silica | globular silica |
| average particle diameter (nm) | 60 | 60 | 200 | 60 | 60 |
| volume shape coefficient | 0.5 | 0.5 | 0.5 | 0.5 | 0.5 |
| amount (%) | 0.03 | 0.03 | 0.2 | 0.03 | 0.03 |
| inert particles B | acrylic filler | acrylic filler | acrylic filler | acrylic filler | acrylic filler |
| average particle diameter (nm) | 30 | 30 | 30 | 30 | 30 |
| volume shape coefficient | 0.40 | 0.40 | 0.40 | 0.40 | 0.40 |
| amount (%) | 6 | 6 | 6 | 6 | 6 |
| layer thickness (nm) | 5 | 5 | 5 | 5 | 5 |

TABLE 8

| Comparative Example | 5 | 6 | 7 | 8 | 9 |
|---|---|---|---|---|---|
| characteristic properties of film | | | | | |
| water contact angle of layer A (°) | 68 | 95 | 80 | 84 | 69 |
| surface roughness of layer B (nm) | 1.7 | 1.7 | 5.0 | 0.9 | 0.9 |
| blocking peel force | broken | 2 | 3 | broken | broken |
| winding properties | ○ | ⊚ | ⊚ | xx | ○ |
| back coat applicability | ○ | x | ○ | ○ | ○ |
| characteristic properties of tape | | | | | |
| electromagnetic conversion characteristics (db) | +8 | +8 | −3 | +9 | +9 |

As is obvious from Table 6, the laminated thermoplastic resin films of the present invention are very flat on one side and exhibit excellent electromagnetic conversion characteristics and winding properties and high anti-block properties. Further, as is obvious from Table 8, laminated thermoplastic resin films which do not satisfy the requirements of the present invention do not have the above characteristic properties at the same time.

The second base film of the present invention is a laminated thermoplastic resin film which is excellent in anti-block properties, winding properties and processability and provides a metal deposited thin film magnetic recording medium having excellent electromagnetic conversion characteristics.

What is claimed is:

1. A laminated thermoplastic resin base film for a magnetic recording medium, comprising:

a first thermoplastic resin layer having a surface roughness WRa of an exposed surface of 0.1 to 4 nm; and a second thermoplastic resin layer which contains 0.001 to 5 wt % of inert fine particles having an average particle diameter of primary particles of 0.1 to 2.0 μm and 0.001 to 10 wt % of at least one ester wax selected from the group consisting of sorbitan tristearate, pentaerythritol tribehenate, glycerin tripalmitate and polyoxyethylene distearate, and which has a water contact angle of the exposed surface of 70 to 90°, the first thermosplastic resin layer and the second thermoplastic resin layer being laminated together.

2. The film of claim 1, which further comprises a first coating layer containing 0.5 to 30 wt % of second inert fine particles having an average particle diameter of primary particles of 10 to 50 nm and a volume shape coefficient of 0.1 to π/6, laminated on the surface not in contact with the second thermoplastic resin layer of the first thermoplastic resin layer.

3. The film of claim 1, wherein the first thermoplastic resin layer contains substantially no externally added inert fine particles.

4. The film of claim 1, wherein the first thermoplastic resin layer contains 0.001 to 0.2 wt % of inert fine particles having an average particle diameter of primary particles of 30 to 400 nm and a volume shape coefficient of 0.1 to π/6.

5. The film of claim 1, wherein the first thermoplastic resin layer comprises a polyester as raw material.

6. The film of claim 1, wherein the first thermoplastic resin layer comprises polyethylene terephthalate or polyethylene-2,6-naphthalene dicarboxylate as raw material.

7. The film of claim 1, wherein the second thermoplastic resin layer comprises a polyester as raw material.

8. The film of claim 1, wherein the second thermoplastic resin layer comprises polyethylene terephthalate or polyethylene-2,6-naphthalene dicarboxylate as raw material.

9. A magnetic recording medium comprising a base film which is the laminated thermoplastic resin base film of claim 1 and the first coating layer of claim 2 laminated on the surface not in contact with the second thermoplastic resin layer of the first thermoplastic resin layer, and a magnetic layer laminated on the first coating layer of the base film.

* * * * *